United States Patent [19]

Mraz

[11] 3,709,645
[45] Jan. 9, 1973

[54] EXTRUSION HEAD

[75] Inventor: Hans Mraz, Grossauheim, Germany

[73] Assignee: Dunlap Holdings Limited, London, England

[22] Filed: June 22, 1970

[21] Appl. No.: 48,168

[30] Foreign Application Priority Data

July 3, 1969 Germany.................P 19 33 920.9

[52] U.S. Cl.................................425/192, 425/467
[51] Int. Cl..................................................B29f 3/04
[58] Field of Search...........................18/14 G, 14 R; 425/190–192, 467, 466

[56] References Cited

UNITED STATES PATENTS

| | | | |
|---|---|---|---|
| 3,461,500 | 8/1969 | Haley | 18/14 G |
| 2,499,398 | 3/1950 | Lyon | 18/14 G |
| 3,432,886 | 3/1969 | Haley | 18/14 G |
| 1,947,202 | 2/1934 | Homeier | 18/14 G X |
| 2,437,625 | 3/1948 | Taylor | 18/14 G X |
| 2,592,658 | 4/1952 | Colombo | 18/14 G |
| 3,106,746 | 10/1963 | Sunday | 18/14 G X |

FOREIGN PATENTS OR APPLICATIONS

| | | | |
|---|---|---|---|
| 1,267,258 | 6/1961 | France | 18/14 G |
| 1,319,817 | 1/1963 | France | 18/14 G |

*Primary Examiner*—Robert D. Baldwin
*Assistant Examiner*—Michael O. Sutton
*Attorney*—Stevens, Davis, Miller & Mosher

[57] ABSTRACT

An extruder head having a housing, extruder core and core holder in which the limiting surfaces of the exit channel are formed on the extruder core and on the core holder respectively. The construction of the head can be extremely compact and enables extrusions of predetermined wall thickness to be obtained, of which the following is a specification.

3 Claims, 4 Drawing Figures

EXTRUSION HEAD

This invention relates to an extrusion head for extruders for production of tubes or sheets of predetermined wall thickness.

In known extrusion heads of worn extrusion presses the extrusion core is held e.g. by means of a thread in a sleeve which is carried by a housing which goes round the extrusion core. The first limiting surface of the outlet channel is formed on the extrusion core, whereas the second limiting surface is formed on a further sleeve, which is arranged at the front end of the housing. These releasable constructional components of the extrusion head are assembled with the usual fittings. The fitting tolerances thereby produced affect the width of the exit channel of the extruder and lead e.g. in tubes to irregularities in the wall thickness, distributed over the circumference. Moreover a long time has to be spent in adjustment of the extruder to obtain the wall thickness required in any particular case.

The invention is based on the problem of obtaining an extrusion head having constant, predetermined wall thicknesses.

According to the present invention there is provided an extrusion head for an extruder for production of extrusions of predetermined wall thickness which comprises a housing, an extruder core, an extruder core holder to secure the extruder core in the housing and an exit channel, the first limiting surface of the exit channel being formed on an annular component of the extruder core and the second limiting surface of the exit channel being formed as an integral part of the extruder core holder. The construction according to the invention has the advantage that only the tolerances appearing between extrusion core holder and the extrusion core can have an influence on the width of the outlet channel.

The extrusion core holder appropriately has an annular frame in which the extrusion core is received, and the outlet channel is preferably formed between the inner side of the annular frame and the outer side of the extrusion core. An accurate arrangement of the extrusion core in the holder may be obtained by giving the holder a conical fitting surface to take up the extrusion core. Since extruders of the type with which this invention is concerned are used to produce rotationally symmetrical bodies, it is preferred that the axes of the fitting surfaces on the holder and the core be arranged coaxially with the main axis of the extruder core.

Since the part of the holder which receives the extruder core has the form of an annular frame, it is appropriate that the extruder core be conformed to this shape. The core is therefore formed as an annular component having an inwardly directed flange. The flange is plane and is at right angles to the main axis. The axial length and the radius of the annular component are of the same order of magnitude, where the axial length of the annular component can be smaller than its radius, e.g. the ratio of axial length to radius can be about 2:3. These ratios of dimensions of the extruder core make a very compact construction of the total extruder head considered in the axial direction possible, since the holder and the housing of the extruder head can be conformed to the measurements of the extruder core.

The extruder core can be secured against rotation relatively to the holder by an axial fitting pin in the flange of the extruder core, the pin being offset from the main axis of the extrusion head and engaging in a bore in the holder. The fitting pin appropriately runs parallel to the main axis of the extruder head.

The extruder core holder can be constructed in such a way that a cone shaped attachment piece, which is directed away from the extruder core to smooth the flow of material to be extruded through the exit channel of the head, is arranged on its annular frame. The shape of the extruder head housing can be conformed to this attachment piece, which makes it possible to form a funnel shaped channel between the housing and the holder, which connects the exit opening of the press via channels in the holder with the exit channel.

In a further arrangement spiral shaped channels may be arranged both in the housing and in the holder of the extruder core to receive a cooling or heating medium respectively. Also, a channel for passage to the interior of a hollow extrusion can be provided, which channel leads radially from the housing through the holder up to a central channel, which discharges towards the outside through the extruder core on the side of the holder away from the press.

The extruder core is fixed to the holder by means of a nut which lies on the flange of the extruder core and is screwed up on to a central threaded pin of the holder, for which reason the threaded pin and the nut merely serve generally for fixing the extruder core.

In one method for the production of the extruder head which is facilitated by novel and compact construction of the head of this invention the limiting surfaces of the exit channel are relatively roughly fashioned before the assembly of the extruder core with the holder and subsequently the extruder core is assembled with its holder, the extruder core and the extruder core holder then being fashioned by a suitable process e.g. by turning, so that the exit channel may be given an accurate and uniform predetermined width.

This method is particularly important because it makes it possible to avoid possible irregularities in the extruder head by not producing the accurate width of the outlet channel until after termination of mounting the extruder head.

This method thus plays a large role primarily when various products with different diameter and different wall thickness are to be produced with the same extrusion press. Since the core and holder accurately define the outer channel when in their position, if the outlet channel has been finished to its exact width, and since this position can be produced again at any time by means of the fitting pin which is present, it is ensured that a pair consisting of an extruder core and an accompanying core holder during later use forms the exactly similar width of outlet channel again as in the earlier use.

Obviously it is also possible to produce products, the wall thicknesses of which have predetermined irregularities in the circumferential direction, which are produced by appropriately formed extrusion cores, extrusion core holders or component parts of extrusion cores and/or by suitable working of these components in the region of the exit channel.

The invention will now be described in more detail, by way of example only, with reference to the accompanying drawings in which.

Figure 1:
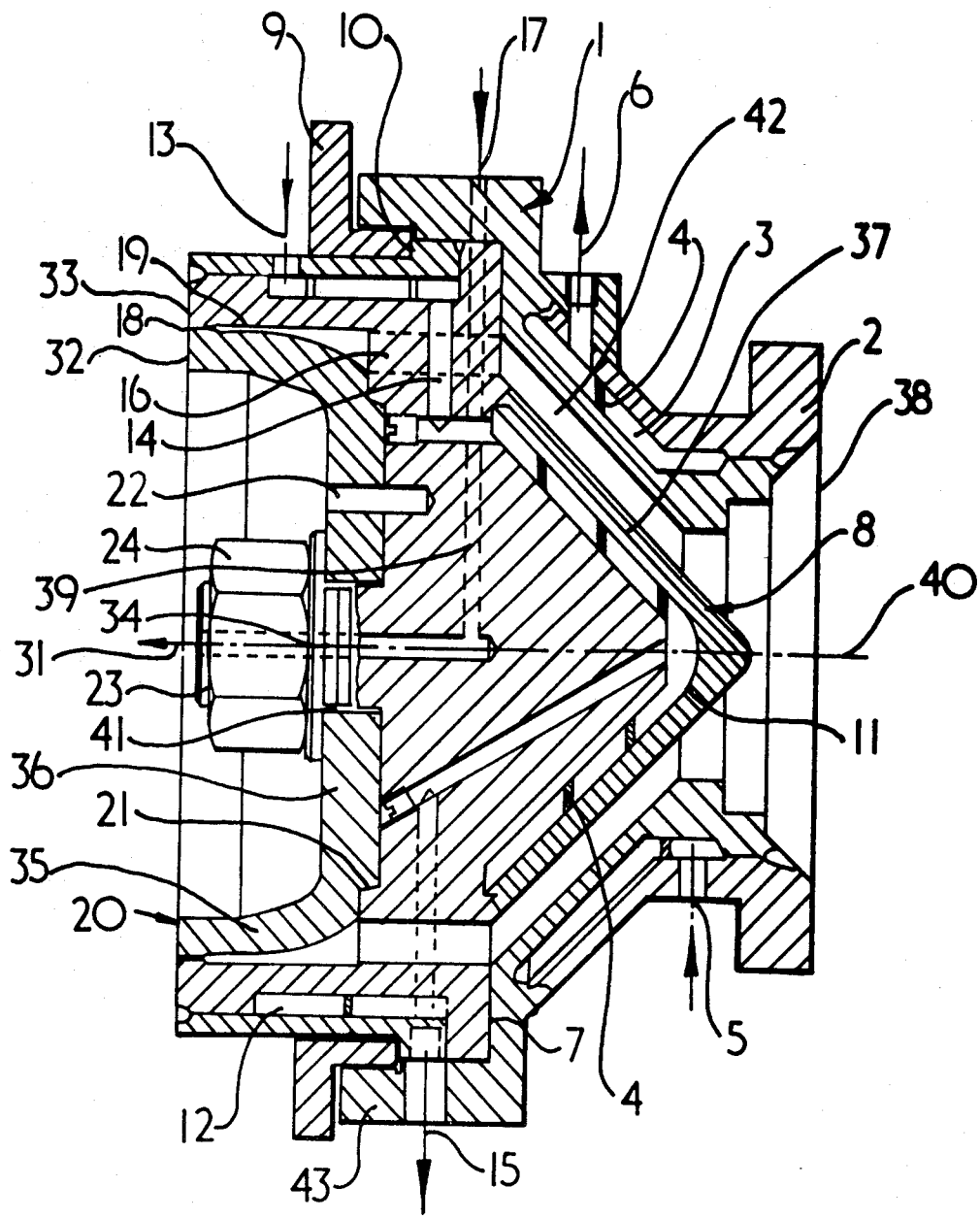
FIG. 1 is an axial cross-section of an extruder head according to the invention.

As shown in FIG. 1, the extruder head according to the invention consists of a housing 1, an extruder core holder 8 and an extruder core 20. Between the extruder core holder 8 and the extruder core 20 an outlet channel 18 is defined. The outer channel 18 is defined by a first limiting surface 32 on the extruder core 20 and a second limiting surface 33 on the extruder core holder 8.

The extruder core 20 is taken up in an annular frame 7. The extruder core has an annular component 35 having a flange 36 directed towards the main axis 40 of the extruder head. On the annular frame 7 of the holder 8, a conical fitting surface 21 is formed, which cooperates with a corresponding fitting surface on the flange 36 of the extruder core 20. This surface determines the radial position of the extruder core 20 relative to the holder 8. The fitting surface 21 is concentric with the main axis 40 of the extruder head, the components of which are formed essentially symmetrical with respect to rotation about the main axis 40.

Fixing of the extruder core 20 in the axial direction is by means of a nut 24, which is screwed onto a central threaded pin 23 of the holder 8 and lies on the flange 36 of the extruder core 20. In the circumferential direction the extruder core 20 is fixed by a fitting pin 22, which extends through the flange 36 into the holder 8. There is a clearance 41 between the bore of the flange 36, through which the threaded pin 23 extends, and the threaded pin. Such an arrangement is possible since exact positioning of the extruder core 20 results from the conical fitting surface 21 and the fitting pin.

The holder 8 itself has a cone shaped extension piece 37 on the end towards the press. In the area of the extension piece 37 the housing 1 conforms in shape to this extension piece. Thus a funnel shaped connection channel 42 is produced, so that a flow path from the exit opening 38 of the press through the connection channel 42 and cut-away openings 25 (FIG. 2) to the exit channel 18 is formed for the material to be worked. The cut-away openings 25 are built concentric with the main axis 40 in the annular frame of the holder 8 and are separated from each other by webs 16, as can be seen from FIG. 2. The annular component 35 of the extruder core 20 narrows to the flange 36, so that the exit channel 18 widens up to the cut-away openings 25 to the width thereof.

The extruder head has a heating or cooling system which is composed of two groups of channels. The first group consists of channels 11, 12 arranged spirally in the holder 8, of which an inlet opening 13 is formed directly on the holder 8 and an exit opening 15 is constructed by the holder 8 and the annular flange 43 of the housing 1. The second group of channels is likewise arranged spirally in the housing 1 and provided with an inlet opening 5 and an outlet opening 6. The channels are respectively separated from each other by means of bridges 4. A channel 34, 39 is provided, leading radially inwards from an inlet opening 17 through the housing 1 and the holder 8 and through a central exit opening 31 in the threaded bolt 23 to the center of an extrusion when the head is in use.

The holder 8 is held in the housing 1 by a threaded ring 9 on the annular flange 43 of the housing 1.

Figure 2:
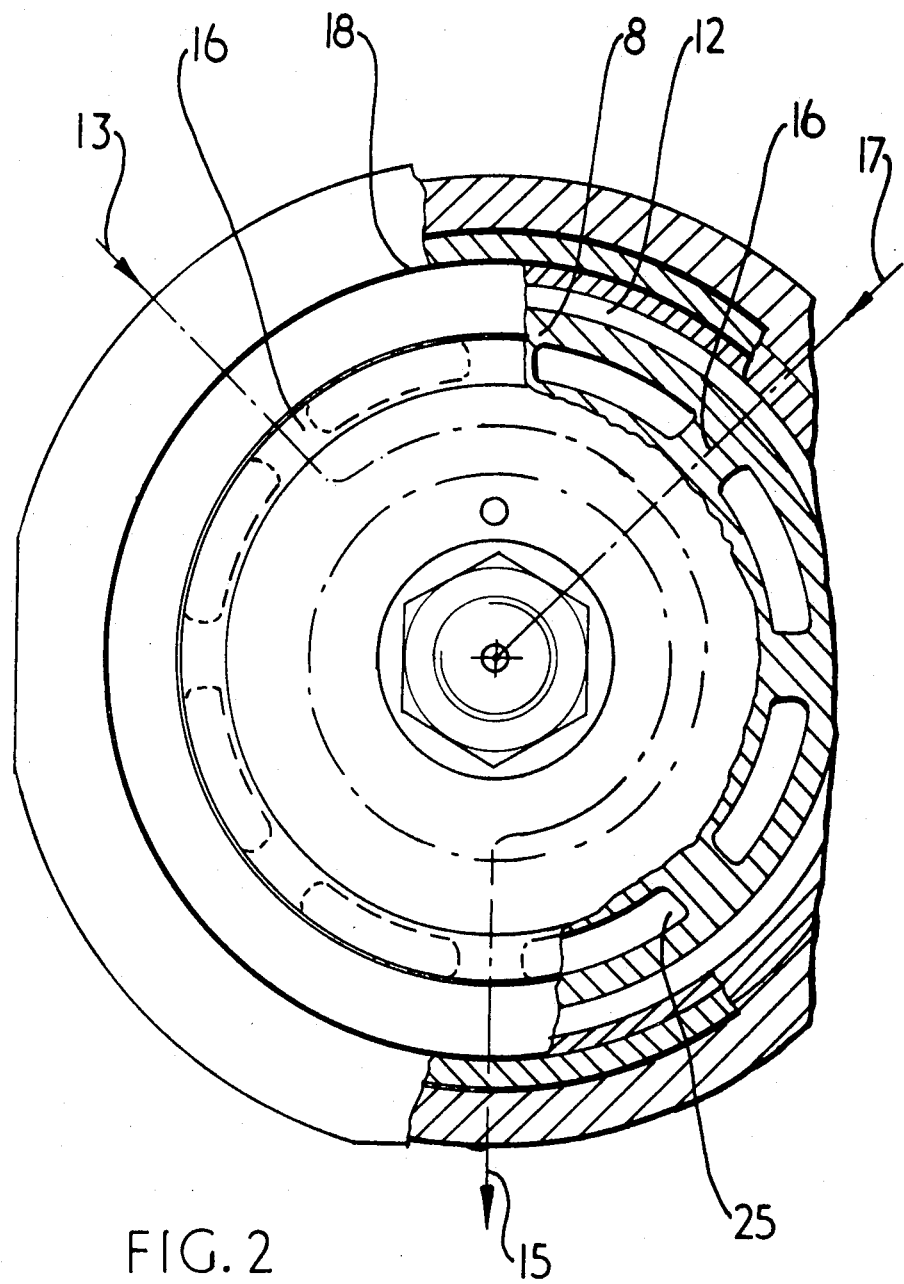
FIG. 2 is a part plan view of an extruder head of the type shown in FIG. 1 partially broken away.
Figure 3:
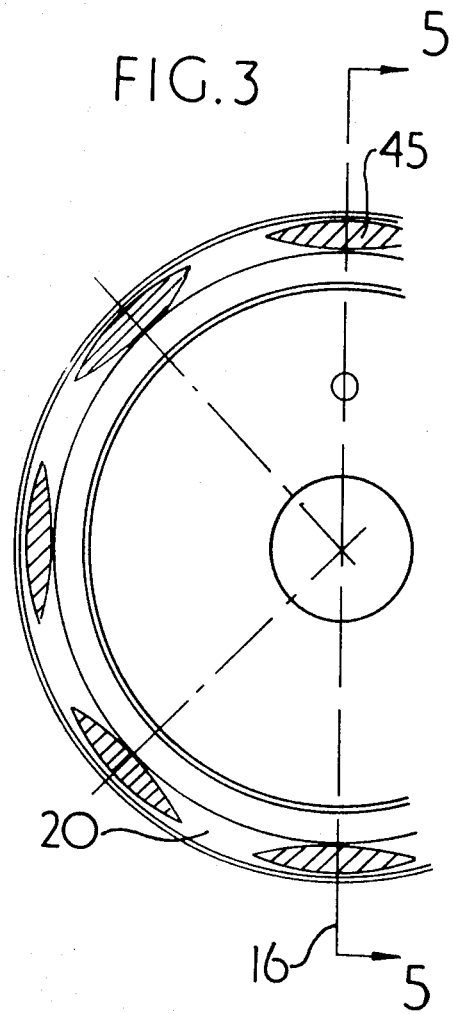
FIG. 3 is a rear view of part of an alternative form of extruder core.
Figure 4:
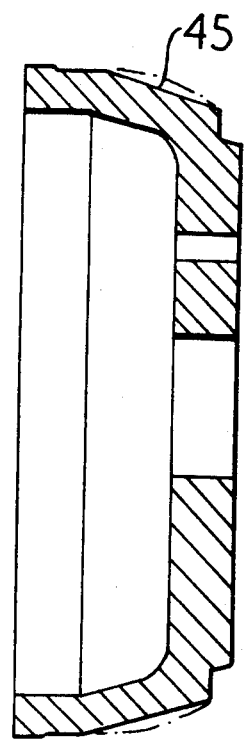
FIG. 4 is an axial section along the line 5—5 of the extruder core shown in FIG. 4.

In the extruder head shown in FIGS. 1 and 2, in order to improve the flow of material after the webs 16 in the direction of the exit channel, flattenings can be formed on the parts of the extruder core opposite the bridges 16, as can be seen from the flattenings 45 of the extruder core 20 in FIGS. 3 and 4. These flattenings 45 have the task of adjusting irregularities in the material produced, which can be caused by the flow resistance of the bridges. It is possible to form openings in the form of channels instead of or as well as flattenings, which are distributed over the extruder core in a suitable way to produce equal or unequal thickness or compactness of the material produced.

Having now described my invention, what I claim is:

1. An extruder head for an extruder for production of extrusions of predetermined wall thickness comprising a housing; an extruder core, an extruder core holder on which the core is carried within the housing to secure the extruder core in the housing there being locating surfaces on the core and the core holder to facilitate accurate positioning of the core on the core holder; an exit channel, the first limiting surface of the exit channel being formed on an annular component of the core and the second limiting surface of the exit channel being formed as an integral part of the extruder core holder, the core being secured on the core holder whereby the two can be removed from the housing as a single unit, the fitting of the core holder in the housing not affecting the accuracy of dimension of the exit channel.

2. An extruder head according to claim 1 in which the holder is provided with a series of cut-away openings, disposed in a ring and separated by webs, to permit flow of material to be extruded through the holder from the housing to the exit channel.

3. An extruder head according to claim 2 in which flattenings are formed on the extruder core opposite the webs to smooth the flow of material to be extruded from the openings.

* * * * *